(12) United States Patent
Rawson, Sr.

(10) Patent No.: US 8,311,222 B2
(45) Date of Patent: Nov. 13, 2012

(54) HARDWARE BASED MULTI-DIMENSIONAL ENCRYPTION

(75) Inventor: Andrew R. Rawson, Sr., Austin, TX (US)

(73) Assignee: GLOBALFOUNDRIES, Inc., Grand Cayman (KY)

( * ) Notice: Subject to any disclaimer, the term of this patent is extended or adjusted under 35 U.S.C. 154(b) by 1074 days.

(21) Appl. No.: 12/198,239

(22) Filed: Aug. 26, 2008

(65) Prior Publication Data

US 2010/0054471 A1   Mar. 4, 2010

(51) Int. Cl.
*H04L 9/00* (2006.01)

(52) U.S. Cl. ........ 380/268; 713/153; 713/154; 713/187; 380/28; 380/255

(58) Field of Classification Search .................. 380/268, 380/255, 28
See application file for complete search history.

(56) References Cited

U.S. PATENT DOCUMENTS

| | | | |
|---|---|---|---|
| 4,916,649 A * | 4/1990 | Yorozu et al. | 708/404 |
| 5,010,573 A * | 4/1991 | Musyck et al. | 380/28 |
| 5,365,588 A * | 11/1994 | Bianco et al. | 380/42 |
| 6,038,317 A * | 3/2000 | Magliveras et al. | 380/28 |
| 6,206,282 B1 | 3/2001 | Hayes | |
| 6,961,426 B2 * | 11/2005 | Vesely | 380/42 |
| 7,260,726 B1 | 8/2007 | Doe | |
| 7,352,070 B2 | 4/2008 | Ellis | |
| 7,382,877 B2 | 6/2008 | Chen | |
| 7,401,223 B2 | 7/2008 | Walmsley | |
| 7,421,074 B2 | 9/2008 | Jin | |
| 7,743,306 B2 * | 6/2010 | Wen et al. | 714/739 |
| 2007/0244951 A1 * | 10/2007 | Gressel et al. | 708/252 |
| 2008/0304664 A1 * | 12/2008 | Suthaharan | 380/46 |
| 2010/0142705 A1 * | 6/2010 | Reffe | 380/46 |

FOREIGN PATENT DOCUMENTS

EP    1662739 A1 *  5/2006

\* cited by examiner

*Primary Examiner* — Carl Colin
*Assistant Examiner* — Mohammad Siddiqi
(74) *Attorney, Agent, or Firm* — Meyertons Hood Kivlin Kowert & Goetzel

(57) ABSTRACT

A system including a first module and a second module. The first module includes a linear feedback shift register (LFSR) and a permutator circuit. The LFSR outputs a pseudo-random sequence of digital values based on a stored key value. The permutator circuit operates on successive groups of input bits using the pseudo-random sequence. For each of said successive groups, the permutator circuit: (a) selects a bit permutation based on a respective one of the digital values in the pseudo-random sequence, (b) permutes the bits of the group using the selected bit permutation to obtain a resultant group of bits, and (c) transmits the resultant group onto an output bus. The second module also includes an LFSR and a permutator circuit that operate to invert the permutations applied by the first module. In a two-dimensional embodiment, the first module and second module may include additional circuitry for scrambling bits between groups.

14 Claims, 8 Drawing Sheets

Permutations of 4 Bits and their corresponding Inverses

| $P_n$ | Forward Permutation | | | | Inverse Permutation | | | |
|---|---|---|---|---|---|---|---|---|
| | $Q_0$ | $Q_1$ | $Q_2$ | $Q_3$ | $Q_0$ | $Q_1$ | $Q_2$ | $Q_3$ |
| 0 | $D_0$ | $D_1$ | $D_2$ | $D_3$ | $D_0$ | $D_1$ | $D_2$ | $D_3$ |
| 1 | $D_1$ | $D_0$ | $D_2$ | $D_3$ | $D_1$ | $D_0$ | $D_2$ | $D_3$ |
| 2 | $D_2$ | $D_1$ | $D_0$ | $D_3$ | $D_2$ | $D_1$ | $D_0$ | $D_3$ |
| 3 | $D_3$ | $D_0$ | $D_1$ | $D_2$ | $D_1$ | $D_2$ | $D_3$ | $D_0$ |
| 4 | $D_0$ | $D_2$ | $D_1$ | $D_3$ | $D_0$ | $D_2$ | $D_1$ | $D_3$ |
| 5 | $D_1$ | $D_2$ | $D_0$ | $D_3$ | $D_2$ | $D_0$ | $D_1$ | $D_3$ |
| 6 | $D_2$ | $D_0$ | $D_1$ | $D_3$ | $D_1$ | $D_2$ | $D_0$ | $D_3$ |
| 7 | $D_3$ | $D_1$ | $D_0$ | $D_2$ | $D_2$ | $D_1$ | $D_3$ | $D_0$ |
| 8 | $D_0$ | $D_3$ | $D_1$ | $D_2$ | $D_0$ | $D_2$ | $D_3$ | $D_1$ |
| 9 | $D_1$ | $D_3$ | $D_0$ | $D_2$ | $D_2$ | $D_0$ | $D_3$ | $D_1$ |
| 10 | $D_2$ | $D_3$ | $D_0$ | $D_1$ | $D_2$ | $D_3$ | $D_0$ | $D_1$ |
| 11 | $D_3$ | $D_2$ | $D_0$ | $D_1$ | $D_2$ | $D_3$ | $D_1$ | $D_0$ |
| 12 | $D_0$ | $D_1$ | $D_3$ | $D_2$ | $D_0$ | $D_1$ | $D_3$ | $D_2$ |
| 13 | $D_1$ | $D_0$ | $D_3$ | $D_2$ | $D_1$ | $D_0$ | $D_3$ | $D_2$ |
| 14 | $D_2$ | $D_1$ | $D_3$ | $D_0$ | $D_3$ | $D_1$ | $D_0$ | $D_2$ |
| 15 | $D_3$ | $D_0$ | $D_2$ | $D_1$ | $D_1$ | $D_3$ | $D_2$ | $D_0$ |
| 16 | $D_0$ | $D_2$ | $D_3$ | $D_1$ | $D_0$ | $D_3$ | $D_1$ | $D_2$ |
| 17 | $D_1$ | $D_2$ | $D_3$ | $D_0$ | $D_3$ | $D_0$ | $D_1$ | $D_2$ |
| 18 | $D_2$ | $D_0$ | $D_3$ | $D_1$ | $D_1$ | $D_3$ | $D_0$ | $D_2$ |
| 19 | $D_3$ | $D_1$ | $D_2$ | $D_0$ | $D_3$ | $D_1$ | $D_2$ | $D_0$ |
| 20 | $D_0$ | $D_3$ | $D_2$ | $D_1$ | $D_0$ | $D_3$ | $D_2$ | $D_1$ |
| 21 | $D_1$ | $D_3$ | $D_2$ | $D_0$ | $D_3$ | $D_0$ | $D_2$ | $D_1$ |
| 22 | $D_2$ | $D_3$ | $D_1$ | $D_0$ | $D_3$ | $D_2$ | $D_0$ | $D_1$ |
| 23 | $D_3$ | $D_2$ | $D_1$ | $D_0$ | $D_3$ | $D_2$ | $D_1$ | $D_0$ |

*FIG. 1C*

HARDWARE BASED MULTI-DIMENSIONAL ENCRYPTION

BACKGROUND OF THE INVENTION

1. Field of the Invention

This invention is related to the field of data encryption, and more particularly, to a system and methodology for securing communication between components within a system as well as for binding the components of a system together.

2. Description of the Related Art

Up until recently the security of communication between modules within a system and the protection of those modules against reuse had not been considered issues worth addressing since it was assumed that the owner of the system had use and disposition rights to both the components that constitute the system and the information that is processed within the system.

These assumptions are no longer valid. Computers and communication devices are used to store and play audio and video content owned by others (and licensed only for limited use). With the advent of pay-as-you-go and subscription-based computing, although the person who pays the initial payment for the service may legally own the hardware, the underwriter of the service has not yet recovered the full market value of the hardware. The underwriter needs the assurance that the system will not be chopped up and the components sold prior to receiving a return on his investment.

While software-based encryption techniques work fine for protecting media content as it is transmitted from the provider to the licensed consumer, these techniques do nothing to protect the content once it has been decoded into a standard audio or video formats within the consumer's computing system or communication device. To extend rights management into this realm, communication pathways between components within the system must be secured.

To be practical for use inside a system between components, techniques must be employed that are fast and inexpensive to implement since at each inter-module interface data must be encrypted for transmission and decrypted as it is received. As it turns out, the same mechanisms that protect the information transmitted between components can also be used to bind components together.

Herein a module is an electronic component packaged in a self-contained manner. Typically, a module is instantiated as a semiconductor-based integrated circuit mounted on a substrate material that brings out electrical contact points for mounting to a higher-level package such as a printed circuit board. The more general term component is used as a synonym.

For secure communication between systems, one popular alternative is public key encryption using publicly accessible asymmetric encryption/decryption algorithms such as RSA or DSA. Another alternative is encryption based on block ciphers.

In the area of protecting the components that constitute a system or device, one might use some form of physical means of protection. These means would likely be techniques like encapsulating the printed circuit board that supports and interconnects the modules or permanently affixing an enclosure around the printed circuit board assembly to protect the components from removal.

None of the techniques mentioned above are appropriate for the class of products envisioned and addressed by the methods disclosed herein. Encapsulation is typically only appropriate for very low power products. A permanently sealed enclosure would prevent user access to add-in card slots (which are normally provided in a personal computer or communication device to allow functional upgrades) and prevent the adding of specialized I/O and computation devices. In addition, both physical means are easily defeated by a motivated remanufacturer.

Software-based encryption/decryption using a standard public domain algorithm might be used to bind two systems together and secure communication between the systems (provided each system has a processor capable of executing the algorithm). However, software-based encryption/decryption is not appropriate for binding together modules within a system or for securing communication between modules within a system.

Thus, there exists a significant need for mechanisms capable of: (a) providing secure communication between modules using simple algorithms that may be implemented in hardware and operate at high speed; (b) providing a strength of encryption and inter-module binding that is cost effective and appropriate to the assets being protected; and (c) removing economic incentive to remove modules from a cost-subsidized product for resale. Furthermore, it would be desirable for the implementation of such mechanisms to cause minimal disruption of normal manufacturing flows (e.g., the flows for fabricating integrated circuits and for building printed circuit board assemblies and systems).

SUMMARY

In some embodiments, a module may be configured to include a linear feedback shift register (LFSR) and a permutator circuit. The LFSR is configured to output a pseudo-random sequence of digital values based on a key value stored in a key register. The permutator circuit is configured to receive successive groups of bits and receive the pseudo-random sequence of digital values. For each group of said successive groups, the permutator circuit is configured to: (a) select a bit permutation based on a respective one of the digital values in the pseudo-random sequence, (b) permute the bits of the group using the selected bit permutation to obtain a resultant group of bits, and (c) provide the resultant group of bits for transmission onto an output bus.

The bit permutation may be a permutation on N elements, where N is the number of bits in each group of said successive groups, and each of the digital values of the pseudo-random sequence may be M bits in length, where M is greater than or equal to $\log_2(N!)$.

In one embodiment, the module may be implemented as an integrated circuit where the output bus is accessible to one or more devices outside the integrated circuit. In this embodiment, the successive groups of bits may be obtained from a data stream that is supplied by logic within the integrated circuit.

In another embodiment, the module may be implemented as an integrated circuit, where the output bus couples to one or more devices within the integrated circuit. In this embodiment, the successive groups of bits may be supplied by a source external to the integrated circuit.

In another set of embodiments, a system may be configured to include a first module and a second module coupled by a link. The first module includes a first linear feedback shift register (a first LFSR) and a first permutator circuit. The first LFSR is configured to output a first pseudo-random sequence of digital values based on a first key value stored in a first key register. The first permutator circuit is configured to receive successive groups of bits obtained from a first data stream. For each group of said successive groups, the first permutator circuit is configured to (a) scramble the bits of the group with a corresponding permutation determined by a corresponding one of the digital values of said first pseudo-random sequence and (b) provide the scrambled group for transmission onto the link.

The second module includes a second LFSR and a second permutator circuit. The second LFSR is configured to output a second pseudo-random sequence of digital values based on a second key value stored in a second key register. The second permutator circuit is configured to receive the scrambled groups of bits from the link. For each of the scrambled groups, the second permutator circuit is configured to (c) unscramble the bits of the scrambled group with a corresponding permutation determined by a corresponding one of the digital values of the second pseudo-random sequence and (d) provide the unscrambled group for transmission onto a bus internal to the second module.

The first key register and the second key register may be programmed so that the first key value and the second key value are identical. The first key register may be programmed at a time of manufacturing the first module. Similarly, the second key register may be programmed at a time of manufacturing the second module.

The system may be implemented as a printed circuit board, where the first and second modules are integrated circuits mounted on the printed circuit board.

In yet another set of embodiments, a system may be configured to include a first module and a second module coupled by a link. The first module includes first selector logic and a first permutator circuit. The first selector logic is configured to store a first set of $N_R$ column permutations specified for a current frame and to control the output of $N_R$-bit words from a first memory array having $N_R$ rows and $N_C$ columns, where $N_R$ and $N_C$ are each greater than one. The $N_C$ bits of each row are output from the first memory array in an order determined by a respective column permutation of the first set. The first permutator circuit is configured to receive a first pseudo-random sequence of digital values from a first linear feedback shift register. For each of the $N_R$-bit words, the first permutator circuit is configured to (a) scramble the bits of the $N_R$-bit word, using a bit permutation determined by a respective one of the digital values of said first pseudo-random sequence, to obtain an $N_R$-bit scrambled word, and (b) provide the $N_R$-bit scrambled word for transmission onto the link.

The second module includes a second permutator circuit and second selector logic. The second permutator circuit is configured to receive a second pseudo-random sequence of digital values from a second linear feedback shift register and to receive the $N_R$-bit scrambled words from the link. For each of the $N_R$-bit scrambled words, the second permutator circuit is configured to unscramble the bits of the $N_R$-bit scrambled word, using a bit permutation determined by a respective one of the digital values of the second pseudo-random sequence, to obtain an $N_R$-bit unscrambled word. The second selector logic is configured to store a second set of $N_R$ column permutations specified for the current frame and to control the storage of each of the $N_R$-bit unscrambled words into a second memory array having $N_R$ rows and $N_C$ columns. Each of the $N_R$ column permutations of the second set determines an order to store bits into a respective row of the second memory array.

The first linear feedback shift register and the second linear feedback shift register may be programmed so that the first pseudo-random sequence and the second pseudo-random sequence are identical.

The system may be implemented as a printed circuit board, where the first and second modules are integrated circuits mounted on the printed circuit board.

BRIEF DESCRIPTION OF THE DRAWINGS

FIG. 1C is a table of forward permutations and corresponding inverse permutations; the forward permutations are used by the forward permutator 114 of FIG. 1A, and the inverse permutations are used by the inverse permutator 154 of FIG. 1B.

Figure 1A:
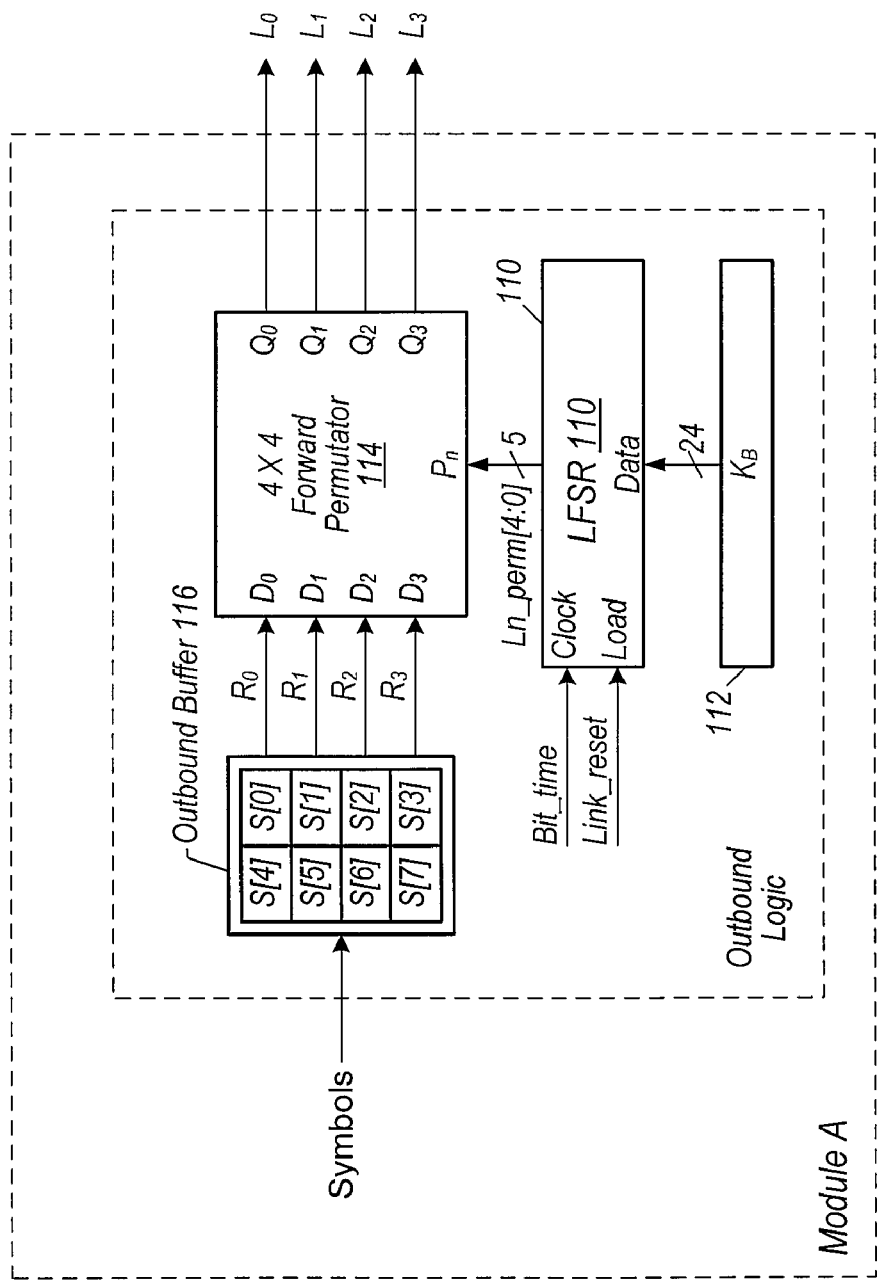
FIG. 1A illustrates one embodiment of logic for encrypting the data leaving a first integrated circuit module (module A).

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. It is noted that the word "may" is used throughout this application in a permissive sense (i.e., having the potential to, being able to), not a mandatory sense (i.e., must).

DETAILED DESCRIPTION OF THE PREFERRED EMBODIMENTS

One Dimensional Encryption

Figure 1B:
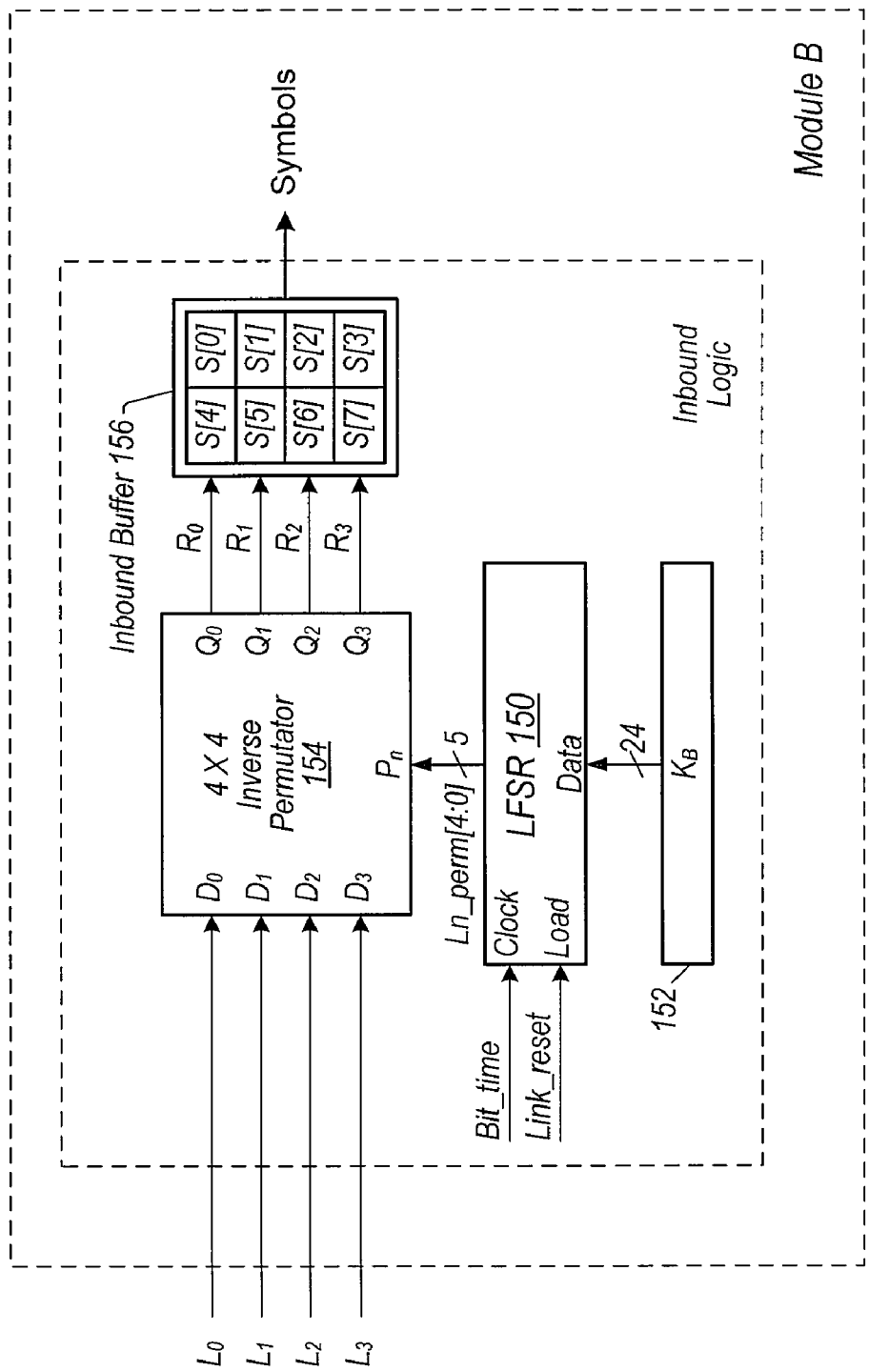
FIG. 1B illustrates one embodiment of logic for decrypting the data arriving at a second integrated circuit module (module B).

The detailed description will begin with a simplified "one dimensional" encryption scheme that introduces the concept of a stream of what appears to an observer of the inter-module communication channel as random symbol data across the physical interface between two modules that are communicating. Refer to FIGS. 1A and 1B for this discussion. Note that for simplicity FIGS. 1A and 1B show only the communication channel from module A to module B. Most real systems would have communication channels in both directions. The return channel may be implemented by replicating the outbound logic of module A in module B and replicating the inbound logic of module B in module A.

In this example the symbol width is 8 bits. Four physical signals carry information from module A to module B. These physical signals will be called lanes (labeled $L_0$ through $L_3$) and could be implemented as individual wires using single-ended signaling technology or using wire pairs in the case of double-ended signaling. Regardless of the signaling technique used, the four lanes carry four bits of information per bit time. Therefore, each 8-bit symbol (designated S[7:0]) is split into two 4-bit sub-symbols. One sub-symbol (S[7:4]) consists of the most significant nibble of the byte-wide symbol and the other least significant nibble (S[3:0]). Each symbol in a stream of symbols is written into outbound buffer 116 by some logic (not shown) within module A.

A linear feedback shift register (LFSR) 110 is used to generate a deterministic but seemingly random sequence of numbers, one number per bit time. Each of the numbers is used to pick a specific permutation of the 4 bits of a corresponding sub-symbol to be placed on the physical lanes at a corresponding bit time. A second LFSR 150 is employed at the destination module (module B in this example). The two LFSRs may be of identical construction (or, at least of such construction as to give functional equivalence).

The feedback within the LFSR 110 is designed so the sequence of numbers generated is maximal. In other words, all possible binary values of 24 bits are generated and the same value is never repeated until the sequence is completed. The number of bits in the LFSR is selected to be sufficiently large (24 in this example) so that it is virtually impossible to guess from outside the module (even knowing the details of the construction of the LFSR) where in the sequence of $2^{24}$ numbers that each generator is at any given bit time.

The sequence generated by LFSR 110 is determined by the key value stored in nonvolatile register 112. (When clocked, LFSR 110 starts its sequence from this stored value.) Similarly, the sequence generated by LFSR 150 is determined by the key value stored in nonvolatile register 152. Because the same key value $K_B$ is programmed into both key registers, the two LSFRs will generate identical sequences. The programming of key value $K_B$ into the key registers 112 and 152 may occur at (or after) the time it has been decided that modules A and B are to be paired together in a system. After the link between the modules is initialized by the assertion of a link reset signal, the two LFSRs will run in lock step, clocked on each bit time.

The outbound section of module A uses a 4×4 forward permutator 114 to swap around bits of each sub-symbol before it is placed on the physical interface between the two modules. In the inbound section of module B this permutation of the bits of the sub-symbol is undone. The 4×4 inverse permutator 154 performs this function.

Note that there are 4! (i.e., 24) permutations of 4 bits. The 4×4 forward permutator block 114 implements the left hand side of the truth table shown in FIG. 1C. For example, if the input $P_n[4:0]=5$, then the input $D_1$ is routed to the output $Q_0$, $D_2$ to $Q_1$, $D_0$ to $Q_2$, and $D_3$ to $Q_3$.

The 4×4 inverse permutator 154 of the inbound section of module B implements the inverse mapping function, where bits coming in on $L_0$ through $L_3$ are mapped onto the rows Ro through $R_3$. This is specified in the right half of the truth table.

Notice that each LFSR is 24 bits in length and the number of bits required to select the permutation for each bit time is 5 (since $2^5>4!$). Thus, the 5-bit number used to select the permutation (or the inverse permutation in module B) during each bit time is constructed by picking off 5 bits from the 24 bits. Any 5 bits of the LFSR can be chosen. The choice may be fixed at system design time.

The truth table has 24 rows corresponding to the 24 permutations of 4 bits. Each row includes a permutation and its corresponding inverse permutation. As the LFSR counts, the 5 bits used to constitute the value Ln_perm will take on each of the values in the range {0:31} (in a pseudo-random order). The logic of the 4×4 forward and inverse permutators is designed so that the $P_n$ values outside the range of the truth table are mapped into that range. In other words, $P_n$ values in the range {24:31} are mapped to the range {0:23}. It is immaterial what mapping is used as long as the forward and inverse permutators implement the same mapping. (As used herein, the notation {a:b}, where a and b are integers, denotes the set of integers x in the interval a≦x≦b.)

Note that the same permutation number $P_n$ used to encrypt a sub-symbol at module A will be supplied to the 4×4 inverse permutator block 154 in the inbound section of module B to decrypt the sub-symbol because the LFSRs in the two modules are clocked in lockstep. The design of the inverse permutator 154 ensures that it unscrambles the bits within the sub-symbol in a manner consistent with the scrambling performed by the forward permutator 114.

In two consecutive bit times, the two sub-symbols of the original 8-bit symbol are transmitted from outbound buffer 116 and reassembled in the inbound buffer 156 of module B.

The above-described mechanism allows module A to transmit information to module B while an observer of the physical interface L[3:0] sees only what appears to be random bit combinations.

As noted above, for duplex communication, an outbound section designed in the same way as module A's outbound section would be implemented in module B, and an inbound section analogous to that shown in module B would be implemented in module A to receive and decrypt symbols sent from module B to module A. The only difference would be the key that is programmed in the key register. For communication from module B to module A, the key $K_A$ (not shown) would be used to initialize the LFSRs in the outbound logic of module B and the inbound logic of module A.

Therefore $K_A$ can be thought of as the key for encrypting messages destined for module A, and $K_B$ as the key used for encrypting messages destined for module B.

In some embodiments, the unique values of the keys $K_A$ and $K_B$ are not disclosed outside the secure manufacturing process, and neither key is visible outside the modules.

In one embodiment, each of the key registers 112 and 152 may be configured as a set of fuses. Thus, the key $K_B$ may be programmed into the key registers 112 and 152 by selectively blowing the fuses of each register.

The one-dimensional encryption technique described above is simple to implement in digital hardware and adds very little delay to the communication path between modules. It could be implemented as described to provide inter-module interface security and binding where the encryption strength it supplies is deemed sufficient. However, for a moderate increase in complexity and implementation cost this technique can be augmented to greatly increase the encryption strength. In the next section, further development of these concepts using a second dimension of scrambling of the bits of a message will be described in detail.

Two Dimensional Encryption

In the two dimensional encryption described in this section, inter-subsymbol bit scrambling is added to the previous technique of sub-symbol bit scrambling. The technique is called "two dimensional" because if the scrambling of bits within a symbol or sub-symbol is thought of as the "X" dimension, then the swapping of bits between sub-symbols is the "Y" dimension and adds the dimension of time-shifting bits between bit times of the serial stream of sub-symbols.

Figure 2A:
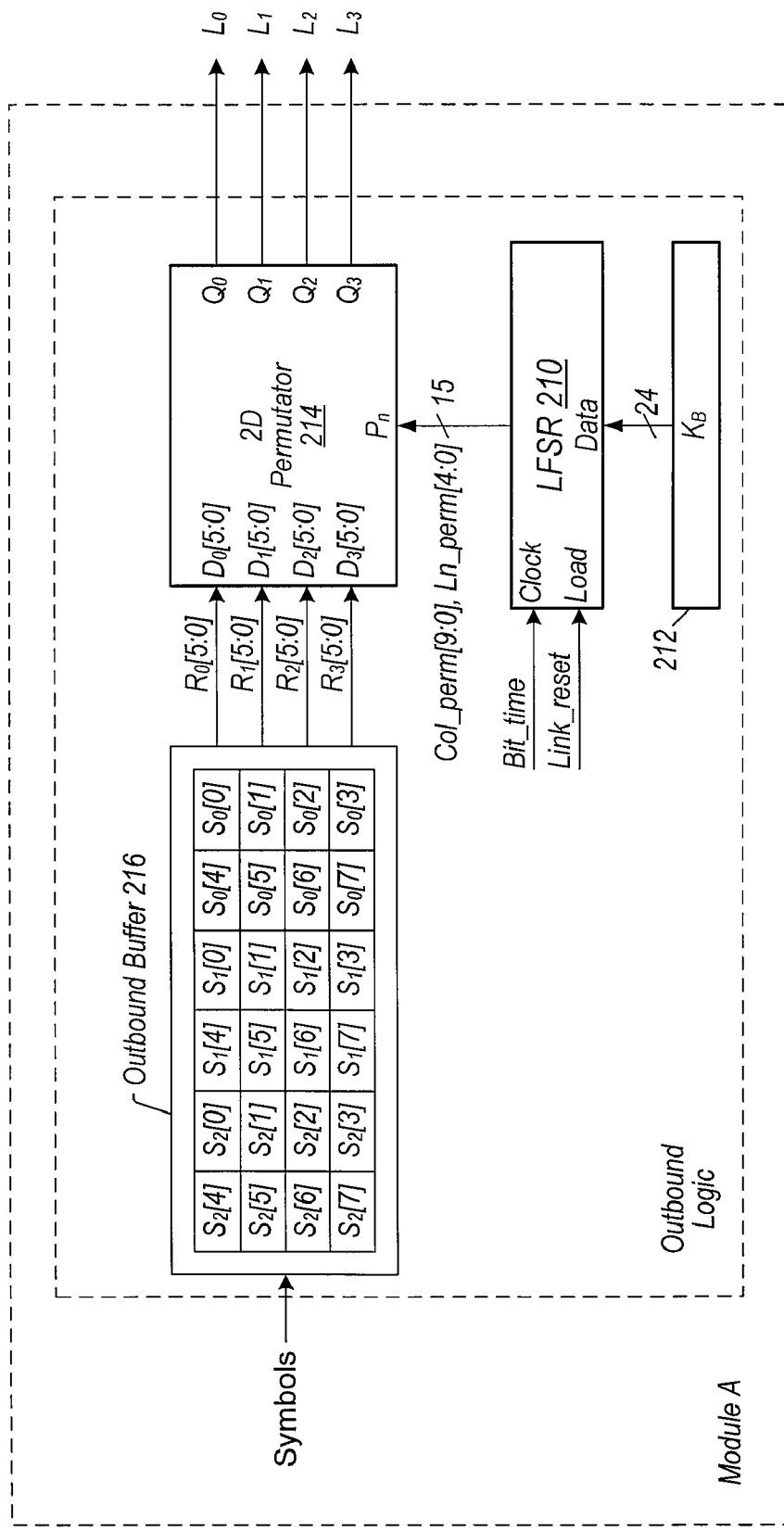
FIG. 2A illustrates one embodiment of logic for performing two-dimensional encryption on data leaving module A.
Figure 2B:
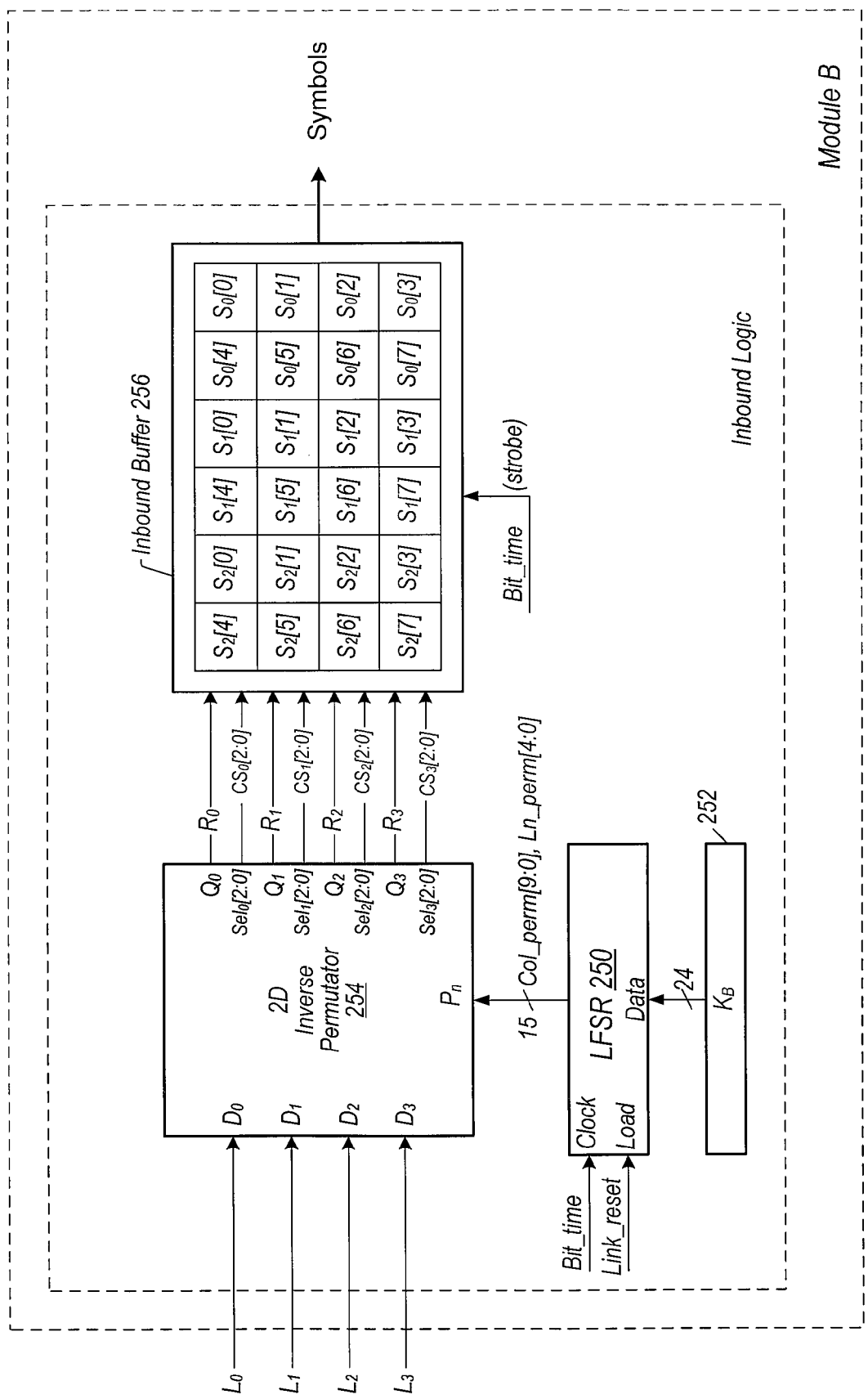
FIG. 2B illustrates one embodiment of logic for performing two-dimensional decryption on data arriving at module B.

A simple extension of the example presented in the last section will be used to describe the two dimensional embodiment. Refer to FIGS. 2A and 2B for the following discussion.

Again, for the sake of simplicity, communication in only one direction will be described. Communication in the return direction would be directly analogous with the roles of sending and receiving modules reversed. FIGS. 2A and 2B illustrate a communication channel from module A to module B. For full-duplex operation the outbound logic of module A would be replicated in module B, and the inbound logic of module B would be replicated in module A.

The block diagram of this communication channel is similar to the previous one except that the outbound buffer 216 and inbound buffer 256 are sized to hold six sub-symbols and the 4×4 permutators are replaced by 2D permutators. (See 2D permutators 214 and 254.) Again the symbol size is 8 bits and each symbol is split into two 4-bit sub-symbols for transmission across a 4-bit wide physical interface.

Encryption in the outbound section of module A involves picking at each bit time 4 bits (one from each row) from the outbound buffer 216 and placing these bits in a seemingly random order on the four physical lanes $L_0$, $L_1$, $L_2$ and $L_3$. Decryption at the receiving module simply requires undoing the scrambling of the row-to-lane scrambling that was done in the sending module and then writing each bit in the correct column of the inbound buffer 256. After six bit times, the contents of the outbound buffer 216 will be replicated in the inbound buffer of B. Note that once a bit within a row of the outbound buffer has been selected for transmission it may not be selected again until the outbound buffer has been refilled with the subsequent message block.

Now a more detailed explanation of this example embodiment of the concept of two-dimensional encryption will be given.

Call the six bit times needed to transmit 24 bits from the outbound buffer 216 of module A to the inbound buffer of module B one frame. The requirement that each bit within a row of the outbound buffer may only be selected for transmission once during a frame corresponds to picking a specific permutation of the bits within the row for that frame. The permutation selected for a given row is independent of the permutation selected for any of the other rows. (It hurts nothing if, for a given frame, the permutations selected for two or more rows are the same since this occurrence can not be predicted by an external observer.) Note that there are 6!=720 possible permutations of 6 things.

For each bit time, the 2D permutator 214 then applies a specific permutation (that is determined by the number Ln_perm provided for that bit time by the LFSR) to the 4 bits, one per row, selected from the output buffer 216. The permuted bits are placed on the physical lanes of the inter-module communication path for that bit time. As discussed in the previous section, there are 4!=24 different ways to map the four rows onto the four physical lanes. This means that there are $(6!)^4 \times (4!)^6$ different ways for one buffer full of data bits to be transmitted from module A to module B during a frame.

Similar to the one dimensional embodiment, in the two dimensional embodiment a linear feedback shift register (LFSR) 210 is used to deterministically, but in a way which seems random to an external observer, select the precise way that the bits will be shuffled prior to being transmitted from module A. A second LFSR 250 within module B (seeded with the same key value $K_B$) precisely tracks the sequence being internally generated by LFSR 210 at the source module. The 2D inverse permutator 254 uses this information to unshuffle the bits of the incoming stream of data.

Over the course of six bit times the inbound channel logic of module B reconstructs the source message in the inbound buffer 256. Note that for each bit $Q_n$ coming out of the 2D inverse permutator 254, a 3-bit column select $Sel_n[2:0]$ is provided. (Since $2^3 > 6$, three bits is sufficient to select any one of six columns for row n of the inbound buffer 256.) This three-bit signal steers the bit $Q_n$ to the correct column position within the $n^{th}$ row of the inbound buffer 256. Finally, the signal bit_time provides the strobe pulse to latch the bit value emitted for each row (by the inverse permutator 254) into the correct column latch of that row.

Consider the control signals to the 2D permutator 214 in the outbound logic of module A. Note that the $P_n$ value that serves as one of the inputs to the 2D permutator is composed of a 10-bit Col_perm field and a 5-bit Ln_perm field. Ten bits are enough to select one of the 720 different possible permutations of the bits in one row of the buffer. But there are four rows. Thus, the LFSR 210 provides four Col_perm values prior to the beginning of a frame, e.g., at bit times $t_{-5}$, $t_{-4}$, $t_{-3}$, and $t_{-2}$. These Col_perm values are captured into latches (see FIGS. 3 and 4) and used throughout the frame time. During the frame time starting at time $t_0$, a 5-bit value Ln_perm is supplied by the LFSR 210 during each bit time to select one of the 24 possible permutations of the 4 row bits (one bit from each row) onto the physical lanes.

Figure 2C:
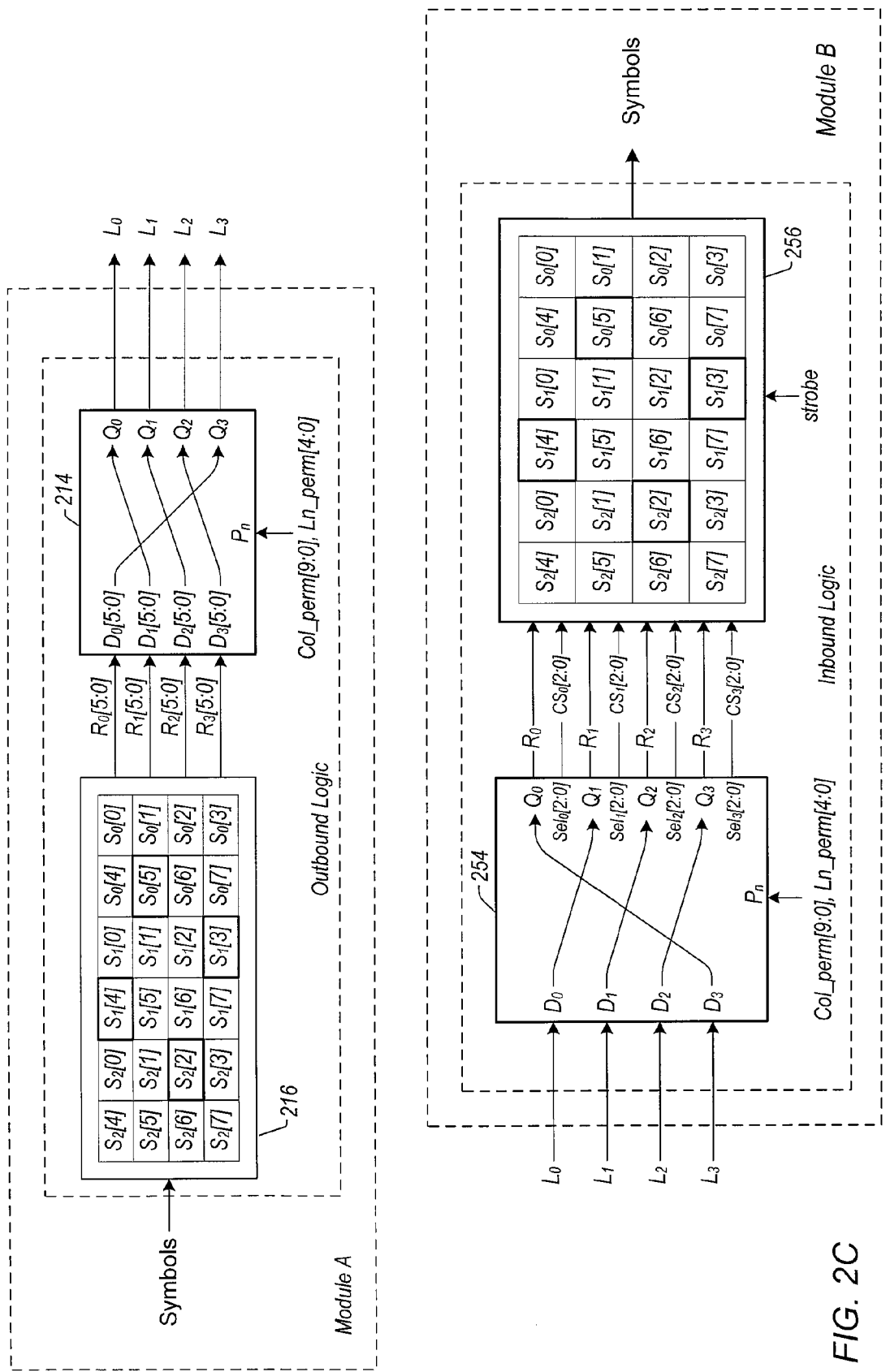
FIG. 2C illustrates an example of the forward permutation and then inverse permutation of data during a particular bit time.

In FIG. 2C, several cells are highlighted in outbound buffer 216 and inbound buffer 256, and several arrows are superimposed on the 2D permutator 214 and 2D inverse permutator 254. These highlighted cells and superimposed arrows provide an example of the process of encryption and decryption during a particular bit time, say bit time $t_0$. (In FIG. 2C, the LSFRs 210 and 250 and the key registers 212 and 252 are omitted merely to avoid cluttering the diagram.) The highlighted cells represent the bits within each row that have been selected by the 2D permutator 214 based on the four Col_perm values that were latched during the previous frame time. The superimposed arrows show how the bit selected from each row is steered to one of the physical lanes for transmission to module B. For bit time to, assume that the value of Ln_perm is 17 (decimal). Referring back to the truth table of FIG. 1C, this means that for row 0 the selected bit $S_1[4]$ will go out on $L_3$, $S_0[5]$ will be sent on $L_0$, $S_2[2]$ on $L_1$, and $S_1[3]$ on $L_2$. The logic of the inbound channel of module B steers the data on the four lanes to the correct bits in the inbound buffer 256 in the following way: at bit time $t_0$ the value of Ln_perm presented to the inverse permutator 254 is the same value 17 as that used to shuffle the row bits onto the lanes at module A. During bit times $t_{-5}$, $t_{-4}$, $t_{-3}$, and $t_{-2}$, the inverse permutator 254 has latched the same four Col_perm values that the forward permutator 214 in module A did during the same bit times. The 2D inverse permutator 254 uses the Ln_perm information provided by LFSR 250 to steer the data on $L_0$ (i.e., the data provided at the $D_0$ input) to the $Q_1$ output. It uses the Col_perm value for row 1 (i.e., the second row) to generate the $Sel_1[2:0]$ value of 4 decimal which selects the latch in the fifth column of the second row of the inbound buffer. In like manner, the data bit on $L_1$ is sent to row 2 ($R_2$ in the diagram) along with a $Sel_2$ value of 1. The data on $L_2$ is routed to row 3 and the value of $Sel_3$ is 3. At the same time the data on $L_3$ is routed to row 0 and the value of $Sel_0$ is 2. The routing of bits through the 2D inverse permutator 254 for this example is illustrated in the diagram by the arrows superimposed on top of the 2D inverse permutator. This process places the bits transferred from module A to module B in their correct row/column positions within the inbound buffer 256. During the next five bit times the 20 other bits selected out of the outbound buffer 216 of module A are transferred to their correct positions in the inbound buffer 256 of module B. This completes the transfer of one three-symbol block of the message from module A to module B.

To send a message longer than 3 symbols in length, the message is broken up into as many 3 symbols blocks as is required and the blocks are transmitted sequentially.

Now details of possible embodiments of 2D forward permutator 214 and 2D inverse permutator 254 will be discussed. Please refer to FIGS. 3 and 4.

Figure 3:
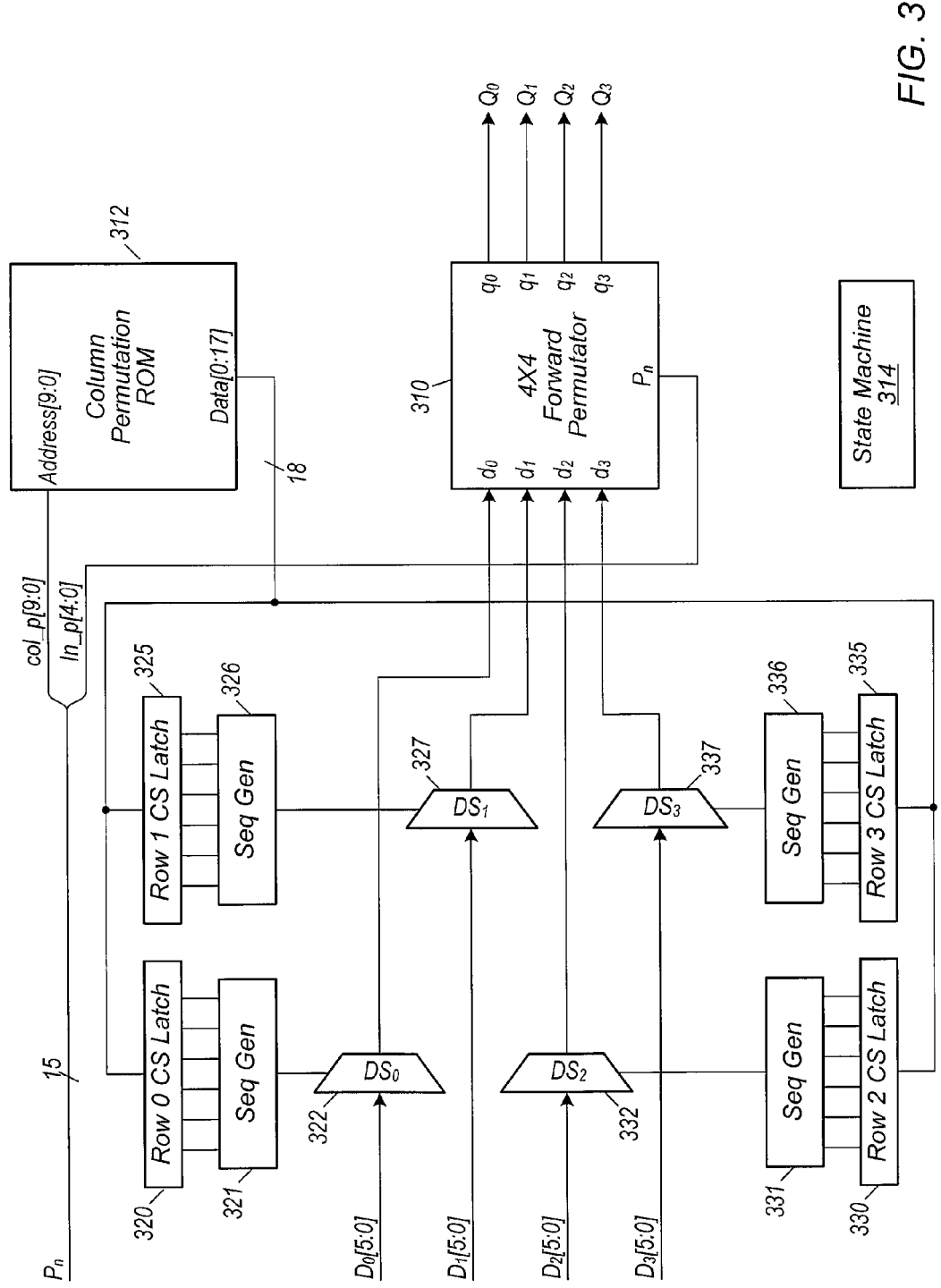
FIG. 3 illustrates one embodiment of the 2D forward permutator 214 of FIG. 2A.

FIG. 3 explodes detail of the 2D forward permutator 214 that appears in FIG. 2A. Most of the operational principles of this functional block have already been presented. This discussion will focus on details not yet elucidated. The column permutation ROM 312 in the upper right corner of FIG. 3 translates the 10-bit value col_p into an 18-bit column selector value. The column selector values are read out of the ROM during four sequential bit times in the previous frame using four different col_p values. Each is captured in a different one of the four row CS latches 320, 325, 330 and 335. Each row CS latch is an 18-bit latch. (The "CS" is meant to be suggestive of the term "column select".)

Each of the row CS latches is coupled to a corresponding one of four sequence generators 321, 326, 331 and 336. Each of the sequence generators is coupled to a corresponding one of four data selectors 322, 327, 332 and 337. Each 18-bit column selector value is composed of six 3-bit data selector values, one for each of the 6 bit times of a frame. Each column selector value represents a corresponding permutation on 6 bits. Each sequence generator (Seq Gen) in the diagram sends one of the six 3-bit data selector values to its attached data selector (DS) during each of the bit times of a frame. (For example, the sequence generator may simply step sequentially through the six data selector values of the column selector value in the 6 successive bit times.)

Each data selector $DS_k$, k=0, 1, 2, 3, selects one of the bits from data input vector $D_k$. Data input vector $D_k$ is 6 bits in length and represents the contents of the $k^{th}$ row of the outbound buffer 216. Data selector $DS_k$ uses the data selector value provided by its coupled sequence generator to select the correct bit within the corresponding data input vector $D_k[5:0]$ (i.e., within the corresponding row of the outbound buffer 216). The selected bit is presented to the 4×4 forward permutator 310 in the middle right of FIG. 3. The 4×4 forward permutator 310 may be configured precisely as described in the previous (one dimensional encryption) section and obeys the left half of the truth table of FIG. 1C.

Note that the 10-bit col_p may take on 1024 different values (i.e., any value in the range {0:1023}) while the number of permutations of 6 bits is 720. Each of the 720 permutations has a corresponding 18-bit column selector value. Thus, there are 720 possible column selector values. The column permutation ROM 312 is populated with column selector values, i.e., every one of its 1024 data entries is a column selector value. Furthermore, in some embodiments, all 720 possible column selector values are represented by at least one data entry in the column permutation ROM. For example, in one embodiment, the first 720 data entries of the column permutation ROM map onto the 720 possible data selector values in a one-to-one fashion, and then, the remaining 304 data entries take values from the set of 720 possible data selector values in any desired fashion.

The state machine 314 in the lower right of FIG. 3 provides clock signals and strobes to latch the column selector values into the row CS latches 320, 325, 330 and 335 and subsequently into the Seq Gen blocks 321, 326, 331 and 336 as well as controlling the parsing out of the 3-bit data selector values to the data selectors during the six bit times of each frame.

Figure 4:
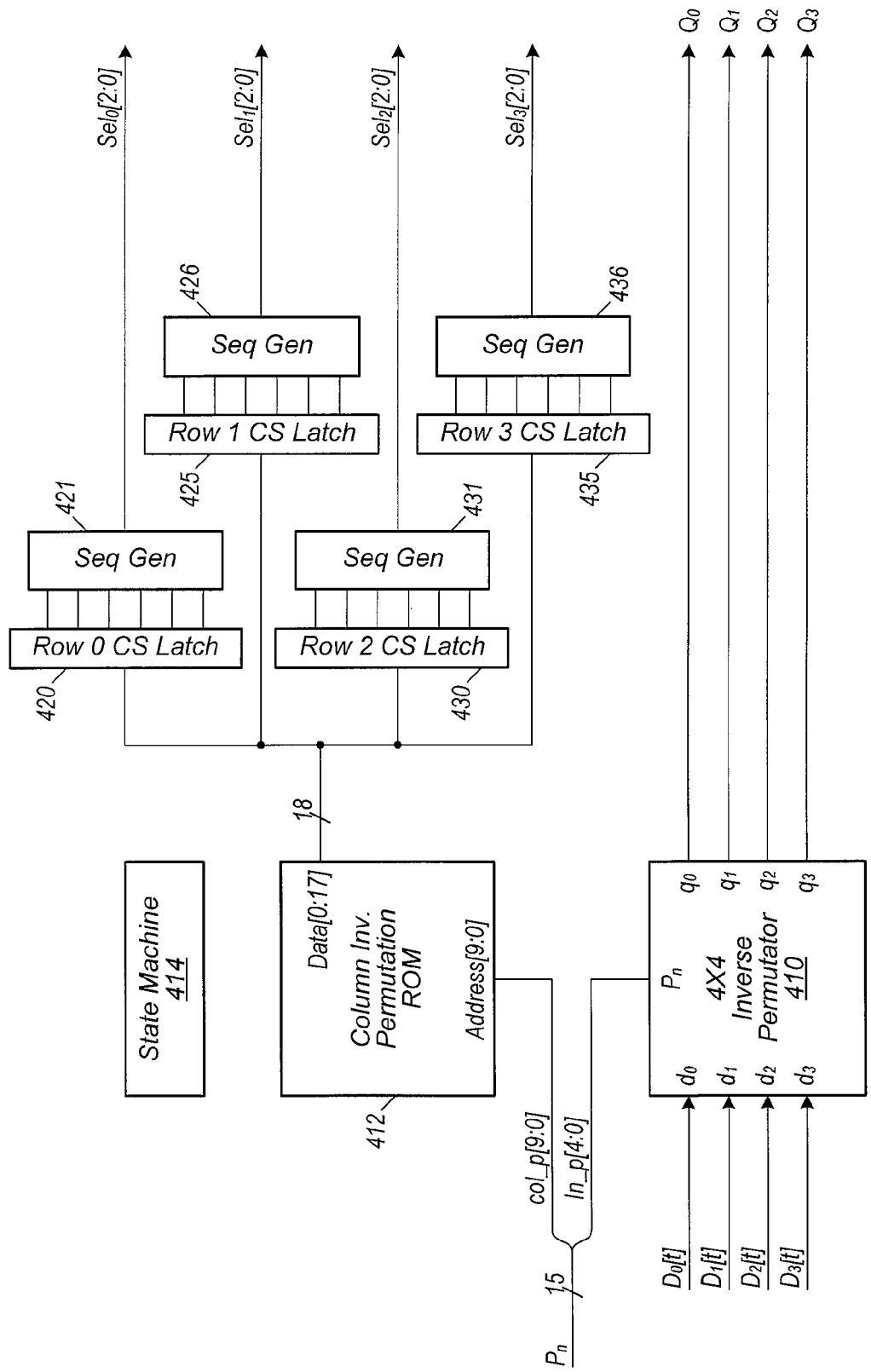
FIG. 4 illustrates one embodiment of the 2D inverse permutator 254 of FIG. 2B.

FIG. 4 shows details of the 2D inverse permutator block 254 that appears in the inbound channel logic of module B. A high-level overview of the operation of this logic block has been presented above. This discussion will point out a few details not yet discussed.

The job of the 2D inverse permutator 254 is to undo the shuffling that the 2D forward permutator 214 carried out based on the $P_n$ values presented to it prior to and during the current frame time. The LFSR 250 presents precisely the same sequence of $P_n$ values to the 2D inverse permutator that was presented to the 2D forward permutator prior to and during the same frame time.

Note that the column inverse permutation ROM 412 in the middle left of FIG. 4 provides precisely the same mapping from col_p value to 18-bit column selector value that the column permutation ROM 312 in the 2D forward permutator provided. The unshuffling of the row-to-lane bit shuffling is performed by the 4×4 inverse permutator 410 in the lower left of FIG. 4. This logic block is the same as (or, is functionally equivalent to what) was presented above in the one-dimensional embodiment and obeys the right half of the truth table of FIG. 1C. In each bit time t of a given frame, t=0, 1, 2, 3, 4, 5, this logic block receives the lane data bits $D_0[t], D_1[t], D_2[t]$ and $D_3[t]$ and steers the lane data bits to the correct rows of the inbound buffer 256 via the outputs $Q_0:Q_3$.

Each of the four bits $Q_0$ through $Q_3$ is stored into the corresponding row of the inbound buffer 256. In other words, bit $Q_k$ is stored into the $k^{th}$ row of the inbound buffer, where k=0, 1, 2, 3.

The column selector values which were read out of the ROM 412 during four sequential bit times in the previous frame provide this information, which is parsed out three bits at a time by the sequence generator (Seq Gen) logic. The output of each row's Seq Gen block appears at the output of the 2D inverse permutator block as one of the outputs $Sel_n[2:0]$ and selects the correct one of six latches within the corresponding row of the inbound buffer for the data bit emitted by the block at the specific bit time.

The state machine block in the upper left corner of the diagram functions similar to the one in the 2D forward permutator, controlling the sequencing of control data from the column inverse permutator ROM.

Alternate Embodiments

There are a variety of alternate embodiments. First, the symbol size and lane widths presented above are just examples. If different values are chosen, then the subdivision of symbols into sub-symbols would be adjusted accordingly. Or, if the number of lanes of the physical interface is the same as the symbol width, no subdivision of symbols is required. Next, the frame size of six bit times per frame used in the 2D encryption example embodiment given above is arbitrary. Basically any frame size could be implemented.

The pseudo-random nature of the intra-symbol and inter-symbol permutations is driven by the value of bits picked off an LFSR. Counters of different construction that exhibit similar deterministic but seemingly random behavior could be used. Counters of different widths could be employed.

The communication between Module A and Module B need not be direct. For example, the data leaving Module A may pass through one or more intermediate buffers or memories before arriving at Module B.

The key used to encrypt/decrypt the information going from module A to module B could be the same as the key used to encrypt/decrypt information going from module B to module A, i.e., $K_A$ and $K_B$ could be the same.

While the above-described methods of providing binding/encryption between modules have been illustrated in terms of a single pair of modules, these methods are not limited to systems having only two modules. Indeed, systems with arbitrary numbers of modules and arbitrary numbers of pair-wise bindings between modules are contemplated. Furthermore, a module may be bound to any number of other modules. Thus, a given system may have any number of one-to-one bindings and any number of one-to-many binding relationships.

While the above-described methods focus on providing binding/encryption between modules of a system, these methods may be applied to provide binding/encryption between systems, e.g., between computer systems coupled through a network. For example, system A may encrypt payload data using one of the above-described methods before injecting the payload data into packets that are transmitted to system B.

Extension to "Higher Dimensions"

Many real systems implement multiple virtual channels between components in order to avoid the blocking of one message by another. This blocking can lead to dead lock situations where the completion of one communication transaction is dependent on the completion of a second that the first is blocking. One way to extend the above-described concepts to the "third dimension" is to swap bits, symbols or sub-symbols between the messages flowing in the same direction in different virtual channels.

What is claimed is:

1. A system comprising a module, and the module comprising:
   a linear feedback shift register (LFSR) to output a first pseudo-random sequence of digital values based on a first key value stored in a first key register; and
   a permutator circuit to receive successive groups of bits and receive the first pseudo-random sequence of digital values, and, for each group of said successive groups, to:
   (a) select a bit permutation based on a respective one of the digital values in the first pseudo-random sequence,
   (b) permute the bits of the group using the selected bit permutation to obtain a resultant group of bits, and
   (c) provide the resultant group of bits for transmission onto an output bus, so that the resultant groups of bits comprise either an encrypted or decrypted version of the received groups of bits;
   the bit permutation is a permutation on N elements; each group of said successive groups is N bits in length; each of the digital values of said first pseudo-random sequence is M bits in length; M is greater than or equal to $\log_2(N!)$;
   the LFSR is to generate a second pseudo-random sequence of internal values each of length L bits; L is larger than M; each digital value of said first pseudo-random sequence is obtained by taking M bits from a respective one of the internal values of the second pseudo-random sequence;
   the LSFR is to generate the second pseudo-random sequence of internal values so that the second pseudo-random sequence of internal values is periodic with period $2^L$ and so that the second pseudo-random sequence visits $2^L$ distinct states within any contiguous sub-sequence of length $2^L$.

2. The system of claim 1, and the module is implemented as an integrated circuit, the successive groups of bits are obtained from a data stream that is supplied by logic within the integrated circuit, and the output bus is accessible to one or more devices outside the integrated circuit.

3. The system of claims 1, and the module is implemented as an integrated circuit, the successive groups of bits are supplied by a source external to the integrated circuit, and the output bus couples to one or more devices within the integrated circuit.

4. The system of claim 1 further comprising:
   a buffer having $N_R$ rows and $N_C$ columns for storing $N_R * N_C$ bits, $N_R$ and $N_C$ are each greater than one, and the buffer is to output said successive groups of bits to the permutator circuit; and
   selector logic to:
      store $N_R$ column permutations corresponding to a current frame, one column permutation for each of the $N_R$ rows of the buffer; and
      control the output of $N_C$ of the successive groups, each of length $N_R$ bits, from the buffer during $N_C$ successive bit times that correspond to the current frame; said controlling includes selecting $N_R$ bits to be output, one bit from each of the $N_R$ rows, in each of the $N_C$ successive bit times; the $N_C$ bits that are selected from each row during the $N_C$ successive bit times are selected in an order determined by a respective one of the $N_R$ column permutations.

5. The system of claim 4, and the selector logic is to receive $N_R$ column permutation indicators from the LFSR during a time period corresponding to a previous frame; the $N_R$ column permutations corresponding to the current frame are determined respectively by the $N_R$ column permutation indicators; each of the $N_R$ column permutations is a permutation on $N_C$ elements.

6. The system of claims 5, and each group of said successive groups is $N_R$ bits in length, each of the digital values of said first pseudo-random sequence is $M_1$ bits in length, $M_1$ is greater than or equal to $\log_2(N_R!)$, each of the $N_R$ column permutation indicators is $M_2$ bits in length, and $M_2$ is greater than or equal to $\log_2(N_c!)$.

7. The system of claim 6, and the LFSR is to generate a second pseudo-random sequence of internal values each of length L bits; L is larger than $M_1+M_2$; the $M_1$ bits of each digital value in the first pseudo-random sequence is obtained from taking $M_1$ bits from a respective internal value of the second pseudo-random sequence; the $M_2$ bits of each of the column permutation indicators is obtained from taking $M_2$ bits from a respective internal value of the second pseudo-random sequence.

8. The system of claim 4 further comprising:
   logic to write successive $N_R$-bit portions of a data stream into successive columns of the buffer.

9. The system of claim 1 further comprising:
   a buffer having $N_R$ rows and $N_C$ columns for storing $N_R * N_C$ bits, $N_R$ and $N_C$ are each greater than one, the buffer is to receive each of the resultant groups from the output bus, each of the resultant groups is $N_R$ bits in length, and the $N_R$ bits of each resultant group are stored respectively into the $N_R$ rows of the buffer; and
   selector logic to control the storage of each of the resultant groups into the buffer, $N_C$ successive ones of the resultant groups are stored into the buffer in $N_C$ successive bit times corresponding to a current frame, the $N_C$ bits stored into the $k^{th}$ row of the buffer are stored at prescribed column positions according to a $k^{th}$ column permutation specified for the current frame.

10. The system of claim 9, and the selector logic is to receive $N_R$ column permutation indicators from the LFSR during a time period corresponding to a previous frame, the $N_R$ column permutations are determined respectively by the $N_R$ column permutation indicators, and each of the $N_R$ column permutations is a permutation on $N_C$ elements.

11. The system of claims 10, and each of the digital values of said first pseudo-random sequence is $M_1$ bits in length, $M_1$ is greater than or equal to $\log_2(N_R!)$, each of the $N_R$ column permutation indicators is $M_2$ bits in length, and $M_2$ is greater than or equal to $\log_2(N_c!)$.

12. The system of claims 11, and the LFSR is to generate a second pseudo-random sequence of internal values each of length L bits, L is larger than $M_1+M_2$, the $M_1$ bits of each digital value in the first pseudo-random sequence are obtained by taking $M_1$ bits from a respective internal value of the second pseudo-random sequence, the $M_2$ bits of each of the column permutation indicators are obtained by taking $M_2$ bits from a respective internal value of the second pseudo-random sequence.

13. A system comprising a module, and the module comprising:
- a linear feedback shift register (LFSR) to output a first pseudo-random sequence of digital values based on a first key value stored in a first key register; and
- a permutator circuit to receive successive groups of bits and receive the first pseudo-random sequence of digital values, and, for each group of said successive groups, to:
  - (a) select a bit permutation based on a respective one of the digital values in the first pseudo-random sequence,
  - (b) permute the bits of the group using the selected bit permutation to obtain a resultant group of bits, and
  - (c) provide the resultant group of bits for transmission onto an output bus, so that the resultant groups of bits comprise either an encrypted or decrypted version of the received groups of bits;
  - the bit permutation is a permutation on N elements, each group of said successive groups is N bits in length, each of the digital values of said first pseudo-random sequence is M bits in length, M is greater than or equal to $\log_2(N!)$ the LFSR is to generate a second pseudo-random sequence of internal values each of length L bits, L is larger than M, each digital value of said first pseudo-random sequence is obtained by taking M bits from a respective one of the internal values of the second pseudo-random sequence, the LSFR is to generate the second pseudo-random sequence of internal values so that the second pseudo-random sequence of internal values is periodic with period $2^L$ and so that the second pseudo-random sequence visits $2^L$ distinct states within any contiguous sub-sequence of length $2^L$; and
- a buffer having $N_R$ rows and $N_C$ columns for storing $N_R*N_C$ bits, $N_R$ and $N_C$ are each greater than one, the buffer is to output said successive groups of bits to the permutator circuit; and
- selector logic to:
  - store $N_R$ column permutations corresponding to a current frame, one column permutation for each of the $N_R$ rows of the buffer; and
  - control the output of $N_C$ of the successive groups, each of length $N_R$ bits, from the buffer during $N_C$ successive bit times that correspond to the current frame; said controlling includes selecting $N_R$ bits to be output, one bit from each of the $N_R$ rows, in each of the $N_C$ successive bit times; the $N_C$ bits that are selected from each row during the $N_C$ successive bit times are selected in an order determined by a respective one of the $N_R$ column permutations.

14. A system comprising a module, and the module comprising:
- a linear feedback shift register (LFSR) to output a first pseudo-random sequence of digital values based on a first key value stored in a first key register; and
- a permutator circuit to receive successive groups of bits and receive the first pseudo-random sequence of digital values, and, for each group of said successive groups, to:
  - (a) select a bit permutation based on a respective one of the digital values in the first pseudo-random sequence,
  - (b) permute the bits of the group using the selected bit permutation to obtain a resultant group of bits, and
  - (c) provide the resultant group of bits for transmission onto an output bus, so that the resultant groups of bits comprise either an encrypted or decrypted version of the received groups of bits;
  - the bit permutation is a permutation on N elements, each group of said successive groups is N bits in length, each of the digital values of said first pseudo-random sequence is M bits in length, M is greater than or equal to $\log_2(N!)$ the LFSR is to generate a second pseudo-random sequence of internal values each of length L bits, L is larger than M, each digital value of said first pseudo-random sequence is obtained by taking M bits from a respective one of the internal values of the second pseudo-random sequence, the LSFR is to generate the second pseudo-random sequence of internal values so that the second pseudo-random sequence of internal values is periodic with period $2^L$ and so that the second pseudo-random sequence visits $2^L$ distinct states within any contiguous sub-sequence of length $2^L$; and
- a buffer having $N_R$ rows and $N_C$ columns for storing $N_R*N_C$ bits, $N_R$ and $N_C$ are each greater than one, the buffer is to receive each of the resultant groups from the output bus, each of the resultant groups is $N_R$ bits in length, the $N_R$ bits of each resultant group are stored respectively into the $N_R$ rows of the buffer; and
- selector logic to control the storage of each of the resultant groups into the buffer, $N_C$ successive ones of the resultant groups are stored into the buffer in $N_C$ successive bit times corresponding to a current frame, the $N_C$ bits stored into the $k^{th}$ row of the buffer are stored at prescribed column positions according to a $k^{th}$ column permutation specified for the current frame.

* * * * *